June 9, 1953 R. L. RULISON ET AL 2,641,553

PREPARATION OF TWO-SIDED MOSAIC

Filed Dec. 29, 1948 2 Sheets-Sheet 1

INVENTORS: R. L. RULISON
G. K. TEAL

BY Hugh S. Wertz

ATTORNEY

June 9, 1953 R. L. RULISON ET AL 2,641,553

PREPARATION OF TWO-SIDED MOSAIC

Filed Dec. 29, 1948 2 Sheets-Sheet 2

INVENTORS: R. L. RULISON
G. K. TEAL
BY Hugh S. Wertz
ATTORNEY

Patented June 9, 1953 2,641,553

UNITED STATES PATENT OFFICE 2,641,553

PREPARATION OF TWO-SIDED MOSAIC

Raymond L. Rulison, Berkley Heights, and Gordon K. Teal, Summit, N. J., assignors to Bell Telephone Laboratories, Incorporated, New York, N. Y., a corporation of New York Application December 29, 1948, Serial No. 67,912

2 Claims. (Cl. 117—33.2)

Figure 1:
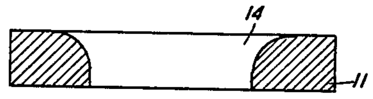

This invention relates to electro-optical devices and more specifically to methods of making target or screen structures for use in television transmitter tubes.

It has long been recognized, in the development of electron camera tubes for generating picture signals at a television transmission station, that there are many advantages in projecting an electron image of the object for transmission onto one side of the screen of the tube and scanning the opposite side of the screen with a cathode ray beam formed in the tube. An example of a camera tube employing such a "two-sided" target or screen is the so-called "image orthicon" tube described in an article entitled "The image orthicon—a sensitive television pick-up tube" by Albert Rose, Paul K. Weimer and Harold B. Law appearing in the July 1946 issue of the Proceedings of the I. R. E. beginning on page 424. The two-sided target makes possible the separation of charging and discharging processes so that the sensitizing procedures and electric fields appropriate to each can be incorporated in the tube without mutual interference. The target must conduct charges between its two sides or surfaces but not along either surface. Moreover, it should have a conducting element therein or nearby to act as the common capacitor plate for the separate picture elements. It has been found to be very difficult to construct satisfactorily commercial targets of this type.

It is an object of the present invention to provide novel and improved methods for making two-sided electron camera tube targets which have a large number of elemental discrete conducting elements per square inch.

In accordance with an exemplary embodiment of the invention, an apertured metallic screen has one side and the interiors of the apertures thereof coated with insulating material, and the uninsulated side is then placed in tight contact with a piece of paper on the surface of a porous cylinder. A suspension of a solid, such as silver oxide in a liquid, is poured upon the screen, the liquid passing through the porous cylinder and the solid remaining in the apertures, a pressure differential being applied between the two surfaces. A reducing solution is then poured upon the screen and filtered through the holes to reduce the silver oxide to silver. The screen is then removed from its support. Alternatively, the screen can be removed from the cylinder before its reduction to silver and placed in a hydrogen reducing atmosphere at elevated temperatures to accomplish the reducing action. The target produced by either of these methods comprises a silver plug extending completely through each of a multiplicity of insulated apertures in a metallic screen, the surface of the plug on one side being practically flat and the other surface substantially so.

Figure 12:
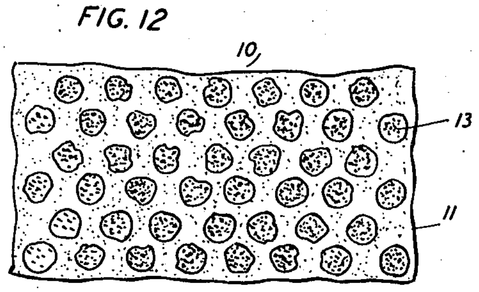
Figure 13:
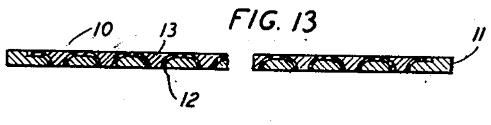

The invention will be more readily understood by referring to the following description taken in connection with the accompanying drawings forming a part thereof, in which:

Figs. 1 to 7, inclusive, show various steps in a process, in accordance with the invention, of making a two-sided screen or target structure for use in television transmitter tubes;

Figs. 8 to 11, inclusive, show various steps in an alternative method of making such a target;

Fig. 12 is a top view of a schematic representation, in greatly enlarged form, of a target made in accordance with either of the methods of the invention; and Fig. 13 is a sectional side view of portions of such a target.

Referring more particularly to the drawings, Figs. 12 and 13 show schematically portions of a two-sided mosaic target 10 suitable for use in certain television transmitting tubes such as, for example, the image orthicon briefly referred to above. This target 10 comprises a thin metallic screen 11 of a suitable material such as nickel having a large number of holes to the linear inch, such as, for example, 400 per inch or more. One surface, such as the top surface in the view of Fig. 13, and the interior of all the apertures, is coated with an insulating material 12. The interior of these apertures is filled with metallic plugs 13. Successive steps in the preparation of the screen or target 10 will be easily understood by referring to the method illustrated, by way of example, by Figs. 1 to 7, inclusive.

Referring now to Fig. 1, it will be noted that there has been shown, in greatly enlarged form, a section of the metallic screen 11. The portion shown is that around one aperture 14 and successive steps (represented by Figs. 2 to 7, inclusive) have been illustrated with respect to what takes place in and around that aperture. It will be understood that the same process takes place in and around every aperture in the screen 11. The nickel screen 11, as pointed out above, has 400 or more holes per inch. Such screens can be obtained commercially.

Figure 2:
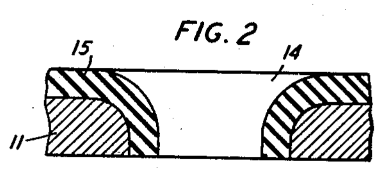
Figure 3:
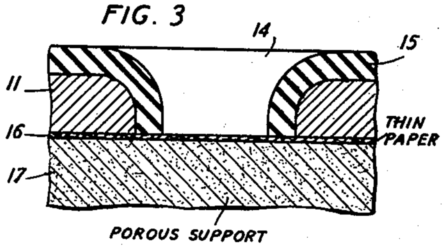

The screen 11 then has evaporated on the top surface thereof, as shown in Fig. 2, a thin layer of magnesium metal or cryolite ($Na_3AlF_4$). If magnesium is used, it is converted to magnesium oxide by heating the screen in oxygen. Such a step is omitted when the screen is coated directly with cryolite. This insulating coating is shown as coating 15 in Fig. 2.

The screen 11 is then stretched tightly against a thin piece of paper 16 (see Fig. 3) on the surface of a porous cylinder 17. This cylinder may be of sintered glass or, as shown in greater detail in Fig. 9, it may comprise a multiplicity of small capillary tubes. A vacuum is applied to the inside of the porous cylinder (lower portion in Fig. 3). Water is then poured on the screen and, after the paper is thoroughly moist, the screen is tightened firmly in place.

Figure 4:
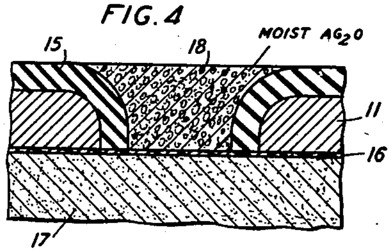

A suspension of a solid, such as silver, copper, silver oxide, silver chloride or copper oxide in a liquid, such as water, is then poured upon the screen and it fills the apertures therein, as shown in Fig. 4. The paper beneath the screen must be fine enough to hold the solid particles but have apertures big enough to let the water through.

Figure 5:
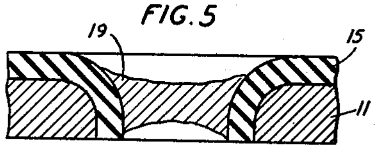

Assuming that an oxide of silver is used, for example, an organic or inorganic reducing solution is then poured upon the screen and filtered through the holes, reducing the silver oxide to silver. The reducing solution can be formaldehyde, a sugar solution, Rochelle salt solution or any one of the many solutions used in photography. This leaves a silver plug 19 as shown in Fig. 5, after the paper 16 and cylinder 17 have been removed.

Figure 6:
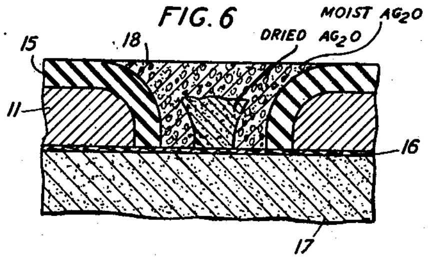

If there is too much shrinkage in the silver oxide due to thorough drying, the above procedure can be repeated by adding some additional silver oxide ($Ag_2O$) as shown in Fig. 6. The shrinkage can be minimized by choosing a solid with a small molecular volume as compared with the atomic volume of the metal finally obtained. Nickel oxide, silver oxide, silver sulfide and cuprous oxide are the best in this respect. By using cuprous oxide and reducing to copper and then replacing the copper, by silver (by dipping in a silver salt solution) this ratio is as small as possible.

Figure 7:
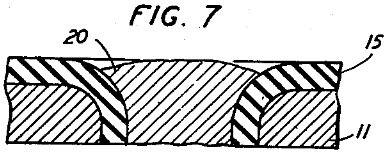
Figure 8:
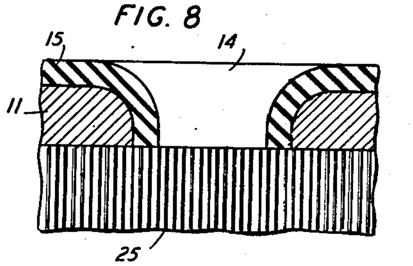
Figure 9:
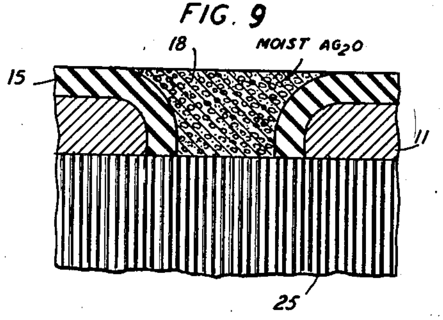

After the above-mentioned repetition of procedure, the additional silver oxide deposited in the holes can be transformed to silver by heating the unit in hydrogen. The final screen is shown in Fig. 7, the silver plug 20 completely filling each aperture 14. The surface of the insulator 15 is preferably rough enough so that the silver plug 20 is locked in so it cannot be jarred out on either side of the screen.

A modified procedure for a portion of the process represented by Figs. 1 to 7, inclusive, is illustrated by Figs. 8 to 11, inclusive. A screen, such as that shown in Fig. 2, is stretched tightly upon the polished surface of the glass filter 25 in the form of a cylindrical tube. The filter consists of a large number of capillaries parallel to each other and perpendicular to the surface of the cylinder. Into the apertures 14 of the screen 10 is poured a suspension of a solid, such as silver oxide, in a liquid, such as water, upon the screen, while a vacuum is applied to the inside of the cylinder. The holes are completely filled with silver oxide and any excess is washed off.

Figure 10:
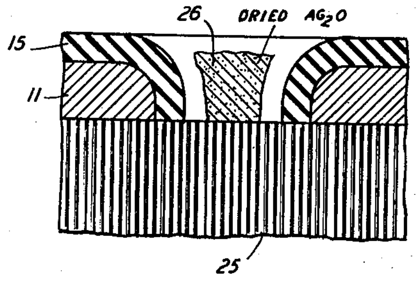

Warm air is then drawn through the holes in the screen so as to dry the silver oxide which is deposited in them and which causes the silver oxide to shrink and appear as plugs 26 shown in Fig. 10.

Figure 11:
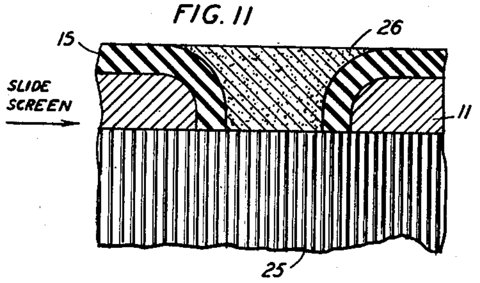

Additional silver oxide suspension in water is then added to fill up the spaces around the dried silver oxide plugs 26. These last two-mentioned procedures are repeated as many times as are necessary to completely fill each hole with dried silver oxide. Without removing the screen from the cylindrical glass filter, it is slid along the surface (as indicated in Fig. 11) to shear the silver oxide buttons 26 away from the glass surface 25. The screen is then removed and the silver oxide reduced to silver by treatment in an atmosphere of hydrogen at elevated temperatures. The finished target is similar to that shown in Fig. 7.

There are many alternative steps and procedures which can be used. For example, a copper screen can be used and in place of the above insulators a thin glass insulation, applied by repeated insufflation and firing, can be employed. Moreover, instead of reducing the moist silver oxide to silver with an organic or inorganic reducing solution, the screen can be removed from the cylinder and placed in a hydrogen reducing atmosphere at elevated temperatures. This can be done with the paper 16 still in contact with the screen. The silver oxide is then reduced to silver and the thin paper filter can be burned off in oxygen. If desired, the assembled screen and cylinder can be heated in a hydrogen atmosphere and the reducing gas drawn through the porous oxide in the holes of the screen. Moreover, if desired, a dry method of getting silver oxide into the holes 14 can be used. In this latter process, a small silk or other bag containing dry silver oxide is hit against the screen or silver oxide is insufflated upon the screen with vacuum applied to the underside. The excess is then brushed off.

What is claimed is:

1. The method of preparing a two-sided target comprising the steps of forming an apertured metallic screen having at least 400 apertures to the linear inch with the interiors of the apertures coated with insulating material, placing one side of said screen against a porous support member, pouring over the screen for filling each aperture an aqueous suspension of finely divided solid particles of reducible compounds selected from the group of metals consisting of nickel, copper and silver and of such size that they can pass through the apertures of the screen but not pass through the pores of the support member, applying a difference in pressure between opposite sides of the supporting member for forcing the vehicle of the suspension through the pores of the support member while leaving the solid particles in the apertures of the screen, and reducing the solid particles to metallic form.

2. The method of preparing a two-sided target comprising the steps of forming an apertured metallic screen having at least 400 apertures to the linear inch with the interiors of the apertures coated with insulating material, placing one side of said screen against a porous support member, pouring over the screen for filling each aperture an aqueous suspension of finely divided solid particles selected from the group consisting of nickel oxide, silver oxide, silver sulfide and cuprous oxide and of such size that they can pass through the apertures of the screen but not pass through the pores of the supporting member, applying a difference in pressure between the sides of the supporting member for forcing the water through the pores of the support member while leaving the solid particles in the apertures of the screen, and reducing the solid particles to their metallic form.

RAYMOND L. RULISON.
GORDON K. TEAL.

References Cited in the file of this patent

UNITED STATES PATENTS

| Number | Name | Date |
|---|---|---|
| 1,667,408 | Allen | Apr. 24, 1928 |
| 1,798,164 | Kuhn et al. | Mar. 31, 1931 |
| 1,922,254 | McCullocy | Aug. 15, 1933 |
| 2,124,224 | Batchelor | July 19, 1938 |
| 2,149,977 | Morton | Mar. 7, 1939 |
| 2,163,266 | Bartels | June 20, 1939 |
| 2,175,701 | Rose | Oct. 10, 1939 |
| 2,179,090 | Holman | Nov. 7, 1939 |
| 2,204,251 | Janes | June 11, 1940 |